US012038170B1

(12) United States Patent
Spiro

(10) Patent No.: US 12,038,170 B1
(45) Date of Patent: Jul. 16, 2024

(54) ORIENTATION SPECIFIC LUMINAIRE

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 18/401,448

(22) Filed: Dec. 30, 2023

Related U.S. Application Data

(63) Continuation-in-part of application No. 18/381,231, filed on Oct. 18, 2023, now Pat. No. 11,901,718.

(60) Provisional application No. 63/548,311, filed on Nov. 13, 2023.

(51) Int. Cl.
*F21V 5/08* (2006.01)
*F21S 8/04* (2006.01)
*F21V 5/04* (2006.01)
*F21V 14/02* (2006.01)
*F21Y 105/10* (2016.01)

(52) U.S. Cl.
CPC ................ *F21V 5/08* (2013.01); *F21S 8/046* (2013.01); *F21V 5/04* (2013.01); *F21V 14/02* (2013.01); *F21Y 2105/10* (2016.08)

(58) Field of Classification Search
CPC .... F21V 5/08; F21V 5/04; F21V 14/02; F21S 8/046
See application file for complete search history.

(56) References Cited

U.S. PATENT DOCUMENTS

| | | | | |
|---|---|---|---|---|
| 6,210,018 | B1 * | 4/2001 | Kassay | F21V 15/01 362/225 |
| 10,323,824 | B1 * | 6/2019 | Lim | F21V 5/02 |
| 2010/0270933 | A1 * | 10/2010 | Chemel | H05B 47/155 315/130 |
| 2010/0296285 | A1 * | 11/2010 | Chemel | F21V 21/00 362/249.1 |
| 2012/0307503 | A1 * | 12/2012 | Wilcox | G02B 19/0014 362/308 |
| 2016/0348855 | A1 * | 12/2016 | Zampini | G02B 19/0014 |
| 2017/0175953 | A1 * | 6/2017 | Van Boven | F21K 9/65 |
| 2017/0257925 | A1 * | 9/2017 | Forbis | F21S 8/026 |
| 2018/0231200 | A1 * | 8/2018 | Hierzer | F21V 29/83 |
| 2018/0292071 | A1 * | 10/2018 | Tarsa | F21V 5/08 |

* cited by examiner

*Primary Examiner* — Bryon T Gyllstrom
(74) *Attorney, Agent, or Firm* — XSENSUS LLP

(57) ABSTRACT

Orientation specific lensed optics disposed over a light source of a luminaire illuminates vertical and horizontal surfaces regardless of the luminaire form. The luminaire is coupled to a mounting device and the mounting device is free to rotate about its vertical axis to align the luminaire with other like luminaires and/or room geometry while the mounting device is coupled to a structure above by a single point of attachment.

30 Claims, 8 Drawing Sheets

ORIENTATION SPECIFIC LUMINAIRE

CROSS-REFERENCE TO RELATED APPLICATIONS

The present application claims the benefit of the earlier filing date of U.S. Provisional Application 63/548,311, filed on 13 Nov. 2023, the entire contents of which being incorporated herein by reference, and claims priority to U.S. Utility patent application Ser. No. 18/381,231, filed 18 Oct. 2023, the entire contents of which being incorporated herein by reference.

BACKGROUND

Technical Field

The present disclosure relates to luminaires, and more particularly luminaires that illuminate vertical and horizontal surfaces.

Discussion of Background

Low and high bay luminaires are often mounted at mounting heights that typically range between 15 feet and 50 feet above a finished floor. Today, the most common luminaire light source is based on a set of light emitting diodes (LEDs). The LED light source is planar and hosts an array of individual LEDs, with the light emitted from this planar LED light source directed toward the floor below. The luminaire is typically suspended from a structure above by cables, chains, or a conduit.

As recognized by the present inventor, FIG. 1*a* and FIG. 1*b* illustrate inefficiencies with present-day vertical illumination provided by low and highbay luminaires when mounted above an elongated space such as a racked aisle. FIG. 1*a* is for one main brand highbay luminaire, and FIG. 1*b* is for another main brand luminaire. The racked aisle 10 is an elongated space with at least one vertical surface 2, and FIGS. 1*a* and 1*b* shown from the perspective of facing the one vertical surface, with a person 20 walking in an aisleway which runs from left to right in the figures. Two luminaires 5 are shown suspended above the racked aisle 10 spaced apart by a distance H3. The luminaire's height from the floor is H1, and H2 is the top edge of the vertical surface 2 of the rack illuminated by the luminaires 5.

FIGS. 1*a* and 1*b* show that the highest vertical light levels emitted by the luminaire 5 across the face of the vertical plane 2 occurs well above an adult human eye level 30, contrary to where it should be. A band of higher light intensity should extend above and below the adult human eye level 30, in a range 19, along the length of the face of the vertical surface 2. Herein, the range 19 is an inclusive range of 3' above the finished floor 1 to 7' above the finished floor 1—this range of 3' to 7' is sometimes referred to herein as "the inclusive range" and is intended to cover a height above finished floor of the aisleway on the vertical surface that defines one side of the aisleway, the vertical surface usually being racks of goods, or a wall. A portion of the energy (region 6*a*) associated with the exceedingly intense light levels is wasteful. Further, the human eye is configured to home in on well-lit surfaces. As a result, surfaces within the range 19 in these figures is relatively dim.

The present figures also show a poor vertical uniformity ratio between maximum light levels that occur in region 6*a* (a region in which light levels exceed 60% of a target), and minimum light levels (like that in region 6*b*, which is a region in which light is below 60% of a target). Most striking is the relatively short distance between an intense light level surface (sec region 6*a*) and a dim lit surface nearby (see region 6*b*). According to the IESNA guidebook for indoor illumination, an acceptable ratio between maximum to minimum light levels is 3:1. The present figures exceed this ratio as is evident from light levels seen in Tables 1 and 2, as will be discussed below.

Tables 1 and 2 show light levels, in foot candles, on 2.5'×4' (height×length) subregions of a vertical surface of respective conventional lighting systems over aisleways. In these examples, the height of the vertical surface is 22.5' although a similar distribution is present for higher vertical surfaces. In each of Tables 1 and 2 eye level is just above the second row from the bottom. As can be seen, while the light levels at eye levels are around 30 to 32 foot candles, subregions above eye level far exceed the light levels at eye level, with some subregions reaching over 100 foot candles. In the case of Example 1 (Table 1), the peak light intensity is not near eye level, where the goods for sale are often located, but well above eye level, around 17.5'. Thus, significant energy is wasted illuminating less interesting portions of the vertical surface, and the unnecessarily high light intensities gives rise to more glare than desirable for the consumer walking in the aisleway. In the case of Example 2 (Table 2) the luminaires are tilted toward the vertical surface, and have lower output candle power. These combine to lower the peak level to about 15' above the floor ($6^{th}$ row from the bottom), but also cause a much larger region of lower light intensity toward the top of the vertical surface (see the top three rows) as well as create "hot spots" (light exceeding 60% of target) on the vertical surface with large bright subregions compared to surrounding dim subregions: compare the bright subregions at the $3^{rd}$ and $4^{th}$ rows from the top and in the $3^{rd}/4^{th}$ columns (first bright subregions with illumination levels as high as 92 foot candles), and $7^{th}/8^{th}$ columns (second bright subregions with illumination levels as high as 96 foot candles) as compared to adjacent dim subregion (light levels below 60% of target) such as at the $3^{rd}$ row from the top and $5^{th}/6^{th}$ columns (20 and 14 foot candles). Furthermore, in example 2 (Table 2) the upper portion of the vertical surface (see the top two rows) are dimly illuminated. This variation in illumination level is highly disparate with hot spot subregions at 96 foot candles, and dim subregions in the single digits. As with the case of example 1 (Table 1), the peak light intensity is well above eye level. Thus merely tilting the luminaire toward the vertical surface, and adjusting the output levels of adjacent luminaires does not provide the ideal illumination pattern on the vertical surface of an elongated space, and the does not create a peak illumination at eye level.

TABLE 1

Example 1, Light Levels (foot candles) in subregions
2.5' × 4' subregions of vertical surface

| | | | | | | | | | |
|---|---|---|---|---|---|---|---|---|---|
| 11 | 13 | 17 | 15 | 12 | 12 | 15 | 17 | 14 | 12 |
| 41 | 67 | 107 | 88 | 49 | 45 | 81 | 109 | 72 | 42 |
| 56 | 70 | 95 | 84 | 61 | 59 | 79 | 97 | 75 | 57 |
| 51 | 63 | 77 | 71 | 55 | 53 | 69 | 77 | 65 | 52 |
| 46 | 49 | 51 | 50 | 48 | 48 | 50 | 51 | 49 | 46 |
| 39 | 38 | 38 | 38 | 38 | 39 | 38 | 38 | 38 | 39 |
| 31 | 31 | 30 | 31 | 31 | 31 | 31 | 31 | 31 | 31 |
| 26 | 27 | 27 | 27 | 26 | 26 | 27 | 27 | 27 | 26 |

TABLE 2

Example 1, Light Levels (foot candles) in subregions
2.5' × 4' subregions of vertical surface

| | | | | | | | | | |
|---|---|---|---|---|---|---|---|---|---|
| 8 | 9 | 10 | 10 | 8 | 8 | 9 | 10 | 9 | 8 |
| 11 | 12 | 16 | 14 | 11 | 11 | 13 | 16 | 13 | 11 |
| 12 | 36 | 92 | 74 | 20 | 14 | 59 | 96 | 53 | 13 |
| 45 | 56 | 68 | 64 | 49 | 47 | 62 | 68 | 59 | 45 |
| 48 | 46 | 45 | 45 | 47 | 48 | 45 | 45 | 45 | 48 |
| 37 | 37 | 37 | 37 | 37 | 37 | 37 | 37 | 38 | 37 |
| 30 | 30 | 32 | 32 | 30 | 30 | 31 | 32 | 31 | 30 |
| 27 | 27 | 28 | 28 | 27 | 27 | 27 | 28 | 27 | 27 |

Technical Problems

As recognized by the present inventor, a deficiency of present-day luminaires installed in elongated spaces (such as over aisleways) is that the emitted light forms "hot spots" over the vertical surfaces that define the elongated space. The light emitted is cast on surfaces well above eye level for an adult human, and thus is not distributed in an efficient manner. Furthermore, another issue of ceiling-supported luminaires is their respective spacing because ineffective spacing often results in uncomfortable glare as experienced by occupants in the aisleway.

In view of the above, there are four primary constraints that architects, engineers, and lighting designers face when designing the illumination of elongated spaces with low and high bay luminaires. These constraints include:

1. Luminaire selection is decided based on light dispersion patterns dictated by the luminaire's form, thus limiting the selection of luminaire/s due to their form.
2. More than one mounting point to a support structure is required for most luminaires.
3. Inability to illuminate horizontal and vertical surfaces with a high degree of uniformity, regardless of the luminaire's form.
4. The most intense light falls on a portion of a vertical surface that is well above an adult human's eye level, and with some applications a portion of the light emitted is perceived as direct glare.

Solutions

According to one non-limiting aspect of the present disclosure, the present innovation solves the luminaire form driven optical constraints by introducing orientation specific optical lens/es over the LED light source/s. The use of orientation specific optics can be comprised in conjunction with at least one of, a mechanical orientation mounting device and a heat dissipating structure with coupled light sources and optical lens/es configured to rotate horizontally about a driver housing.

Other solutions are provided throughout the detailed description that follows.

SUMMARY

According to an aspect of the present disclosure, an orientation specific lensed optics disposed over a light source of a luminaire illuminates vertical and horizontal surfaces regardless of the luminaire form. The luminaire is coupled to a mounting device and the mounting device is free to rotate about its vertical axis to align the luminaire with other like luminaires and/or room geometry while the mounting device is coupled to a structure above by a single point of attachment.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

GENERAL DISCUSSION OF EMBODIMENTS

A luminaire's light source can be covered by an optical lens (which itself may include sub lenses) that controls the directionality of the emitted light. The light source may also be covered by a translucent protective lens, which disperses the luminaire's light in roughly a natural +/−120° light dispersion pattern of a LED lamp.

The LED luminaire with coupled LED lamps can also employ a reflector and/or a refractor. At least the refractor, or the refractor and reflector, can substitute for a protective optical lens over the LED light source. In embodiments discussed herein, both a protective lens over the LED and a refractor may be used together or separately.

The LED luminaire can have several forms including round, square, and rectangular. The decision to use one form of luminaire over another is driven by architectural, economic, and performance considerations. Among the performance considerations a designer must consider is whether each luminaire form provides for the light emittance pattern compatible with the needs of the space to be illuminated. These illumination needs can include at least one of, a horizontal and a vertical surface/s.

As recognized by the present inventor, objectives for a project to illuminate an elongated space at specified intensity levels to targeted surface/s should include using a minimal amount of energy, and generating minimum glare, while maintaining a good uniformity ratio (e.g., 3:1). To achieve these objectives, a lighting designer, when specifying a luminaire, would first need to evaluate whether the luminaire's form with its light emittance pattern is compatible with the space needs. The lighting designer may also have to consider the luminaire's orientation. Such a consideration becomes relevant where orientations of at least two like formed neighboring luminaires must be common and set in relation to the space in which the luminaires are mounted. For this reason, with at least one luminaire form, the lighting designer must consider the choice of the mechanical means of the luminaire support as it affects the associated labor component, the production time, and material costs.

The lens optics over the light source of a rectangular formed luminaire can generate a variety of light dispersion patterns; however, its architectural form imparts lighting directionality by having one horizontal central axis longer than the other horizontal central axis. Further, its installation may require more than one point of mounting support. As recognized by the present inventor, more than one mounting support point, as compared with a single support point, necessitates additional costly structural support members and requires longer installation time and thus increases the installation costs.

Lens optics over a square luminaire can also generate a variety of light dispersion patterns; however, for architectural reasons, it requires orientation alignment with other like luminaires. An advantage of the square luminaire over the rectangular luminaire, as recognized by the present inventor, is that it can be mounted from a single mounting point, and its form is directionally neutral.

Lens optics over the light source of a round luminaire are also directionally neutral. The luminaire can also be mounted from a single mounting point. Round luminaires are often used in retail and institutional spaces which are wide open, but conventional optics over round luminaires are not conventionally viewed as conducive for use in elongated spaces, mainly for their lack of directionality. The elongated spaces, for example, can be racked aisles within a big box retail space.

Corridors and aisles where rectangular, square, and round shaped luminaires are used represent a substantial portion of all real estate for retail "big box" outlets, warehousing spaces, and manufacturing spaces.

U.S. patent application Ser. No. 18/381,231, the contents of which is incorporated herein by reference, describes a mechanical orientation mounting device, which may be used with the orientation specific luminaire described herein. The present disclosure further elaborates on the mounting device's connectivity to a luminaire below it and a supporting structure above it.

A luminaire with or without orientation specific light source optics coupled to the orientation specific mechanical mounting device is able to have a user-settable alignment with a like luminaire and/or with a feature of the space in which it is disposed such as an aisleway below or a supporting structure above. Once the luminaire's orientation is set by way of setting the orientation of the mechanical mounting device, the mechanical mounting device can then be permanently secured, which in turn secures the luminaire in position. It is noted that having two cables and/or chains connecting the luminaire to a mounting device assures restoration of the luminaire's orientation to its set position under a condition where the luminaire is accidently hit by a moving object (e.g., a ladder being moved, etc.).

Further, the two suspended support mounting members provide redundant restraints, and thus can protect life and property, when one support mounting member fails. The orientation specific mechanical mounting device can be configured for a single point of connectivity to the structure above. The mounting device coupled to a luminaire can facilitate luminaire alignment regardless of the luminaire form and its optical light dispersion pattern.

In elongated spaces that include racked aisles (aisles have a floor flanked with racks/shelves or a wall on at least one side, but often on both sides), the luminaires can be tasked with illuminating the horizontal surfaces including the floor and furniture that rests on the floor, and the vertical surfaces including walls and/or face of the rack/s. In spaces intended to display merchandising product, the illuminance of the rack's vertical surface is of great importance, as this is where the merchandise is displayed and a shopper will observe it.

The merchandise is often displayed in proximity to an adult human's eye level (e.g., in an inclusive range of 3' to 7', but typically an average height of 5'). For convenience, this document will refer to eye level as being five feet above a finish floor, but the level can be anywhere between three feet and seven feet depending on the circumstances. Therefore, in elongated spaces where merchandise is displayed on racks, the luminaires are configured to provide the most intense light level/s to fall on the vertical face of the rack at about an adult human's eye level, where merchandise that is on display for sale is located. Above, and possibly below, the human eye level, the rack may include storage space for items that are housed until needed. The racked region above the rack(s) around human eye level are accessible via a lift, or ladder, by store personnel and often extend up to 30 feet or so above the finished floor.

Luminaires placed above an aisle flanked by elongated rack space are expected to deliver specified light levels at specific locations, or subregions, along the horizontal and vertical surfaces that define the aisleway. In merchandising and stocking spaces the intense light levels should illuminate vertical surface at, above and below an adult human eye level. In addition, in some applications, the luminaires may be configured to also illuminate the ceiling or support structure above.

An aspect of the presently described luminaire is that it directs its primary light source toward the floor below and/or at least one adjacent vertical surface. In at least one embodiment a plurality of luminaires with LED light sources coupled thereto are located above a racked aisle and are incrementally spaced apart from one another at predetermined distances, usually along a center plane that extends from the middle of the aisle and is parallel to at least one vertical racked wall at the edge of the aisle. Each of the luminaires' light sources are tasked with illuminating at least a portion of a vertical surface comprising the face of a rack adjacent to an aisle, and at least a portion of the aisle's floor surface.

To attain optimal efficiency, the form of a printed circuit board (PCB) that hosts the plurality of the LED lamps comes into play. The orientation of the LED lamps coupled to the PCB can differ from legacy practices, and include planar as well as non-planar topologies (e.g., curved such as parabolic surfaces, and the like). Over the LED light source (i.e., between the LEDs and the regions illuminated by the LEDs), an optical lens is positioned that directs the light toward horizontal and vertical targeted fields of illumination. The lens optionally includes a plurality of sub-lenses that can include at least one dedicated optical lens per LED. Likewise, the sub-lenses may provide the directed optics for a group of LEDs, such as 2, 3, 4 . . . 50. The group of LEDs may be linearly arranged, or grouped in two dimensional arrays if the PCB is planar, or even a 3 dimensional grouping with a PCB that is non-planar.

The present exemplary embodiment includes two crescent shaped PCB's populated with planar LED lamps. Each crescent shown in this embodiment is tasked with illuminating one or more sub fields of illumination on a vertical surface of a rack, as well as one or more sub fields of illumination of the floor of the aisle, adjacent to the lower edge of the vertical surface of the rack. In a different embodiment, the same PCB arrangement includes one or several sections. For example, a three section PCB can be configured with two sections to illuminate the racks, and the third section configured to illuminate the floor between the two racks. As a complement to the LEDs arranged on the crescent shaped PCBs, additional LEDs with optional directional, and orientation settable optics, maybe be hosted in a central hub region that is unoccupied by the pair of crescent shaped PCBs, where the crescent shaped PCBs have an arcuate shape.

The PCB that retains a plurality of LED lamps thereon may be segmented into one or several boards, wherein the board/s can have at least one of a different form, orientation, and number of light sources coupled thereto. The optical lens/es (sometimes referred to herein as "optics") disposed over the PCB retaining the plurality of lamps directs the light emitted from the plurality of the LED lamps toward a designated subfield of illumination target. The targeted subfield of illumination can have at least one of, a specified horizontal and vertical light level intensity value. A subfield of illumination is a sub region of the vertical surface or horizontal surface of the elongated space (aisleway flanked with one or more vertical structures on either or both sides of the floor of the aisleway).

The PCB is fabricated with wiring that provides controllably amounts of electricity to the plurality of the coupled LED lamps and can be configured to controllably operate an individual lamp or groups of lamps. The control of the LED lamps can be different from one another and/or in unison with one another, having optical lens/es over a single or a plurality of LED lamps. The control can be provided by hardwired circuitry (e.g., application specific integrated circuit, ASIC) or programmable circuitry such as one or more processors having one or more central processing units (CPUs) coupled to one or more memories that hold computer readable code therein that, upon execution by the one or more processors, configures the processors to control the electrical flow and illumination control of the LEDs, and/or a luminaire driver, hosted by the luminaire.

The LED lamps coupled to the PCB can differ by at least one of, shape, size, input power, color temperature, and chromaticity. The luminaire driver/s and/or a controller can drive different LED lamps and/or plurality of grouped LED lamps.

The PCB, with or without the dedicated optics, can be replaceable. The PCB can be configured either as orientation specific or non-orientation specific. A switch and/or a rotatable dial device coupled to the luminaire can be configured to manually control (or controlled electrically via a controllable motor such as a stepping motor controlled by a local controller, or a remote wireless controller) at least one aspect of the operation of at least a portion of the lamps coupled to the PCB. In addition, the light emitted can be controlled via at least one of a local/remote communication device and/or sensing device/s.

To maintain an acceptable uniformity ratio of illumination, the light pattern emitted on a subfield of illumination from at least one luminaire can overlap another subfield of illumination. The subfield of illumination can be on a horizontal surface, a vertical surface, or a combination thereof. Given the small size of LED lamps, in at least one embodiment, the orientation of each LED lamp does not have to follow the same form as the surface of the PCB. For example, legacy round PCB's with coupled LED lamps commonly distribute the lamps in concentric rings about a vertical center axis of the PCB. By contrast, in at least one embodiment the LED lamps coupled to a PCB can be arranged orthogonally. In this arrangement, the orientation of at least one side of any one square LED lamp coupled to the PCB is substantially parallel to the orientation of the rack, and at least the adjacent side of the square LED lamp is substantially perpendicularly oriented to the rack.

As will be discussed in more detail below, the present innovation uses both the concentric and the orthogonally arranged LED lamps coupled to a crescent formed PCB of a luminaire mounted above a racked aisle. The LED lamp arrangement described can apply to any form of luminaire light source retaining surface. The orthogonal arrangement of the LED light sources with their respective optical lens/es enable better design control over the zonal distribution of the light emitted by the PCB section/s.

The design of the optical lens of the orientation specific luminaire accounts for at least one of, the luminaire's mounting height from the floor, the distance between a targeted surface and at least one luminaire coupled LED light source, the horizontal and/or vertical target light level intensity specified over a subfield of illumination, offensive glare angles, and inherent optical losses for the light emitted in any one direction.

Aisle widths of elongated spaces can vary by the building use type; however, in retail, manufacturing, and distribution spaces, the width of an aisle commonly ranges from six to twelve feet. Both the vertical surfaces of the elongated space and the elongated space floor can be divided into subzones configured in relation to a luminaire mounted above. The subzones can be further divided into short, medium and long zones. These zones can further be divided into a plurality of subfields of illumination that are contiguous to one another.

The luminaire mounted above an elongated aisle space can employ zone specific lens optics configured to illuminate at least two of the subfields of illuminations. In at least one embodiment, a luminaire with a plurality of lamps can target one or several subfields of illumination, wherein a subfield of illumination near the luminaire can be illuminated by wide angle optical lens/es covering a large subfield area, while a remote subfield can be illuminated by a narrower lens optics (with higher directivity) that may cover a smaller subfield area, albeit with a higher light intensity than without the higher gain optics.

The optics of the orientation specific luminaire is configured to attain specified light levels within a subfield of illumination. The specified light level is referenced herein as the target light level intensity. The lens/es can be placed over at least one of, a single LED lamp, a plurality of LED lamps, a single LED PCB, and a plurality of PCB's. The lens/es can couple to at least one of the PCB and the heat dissipating structure of the luminaire.

For example, the figures (FIG. 2) as will be discussed later in more detail show a luminaire coupled to a support structure above, located over a racked aisle. Two crescent formed PCB's with a plurality of LED lamps coupled are shown with target specific optical lenses above. The two sections of the PCB's can be precisely oriented in relation to at least one of, the longitudinal axis of the elongated space the luminaire mounted above and the vertical surface of the elongated room and/or a rack face.

The right side PCB is configured to illuminate the right half of the aisle and the right side rack surface, and the left side PCB is configured to illuminate the left half of the aisle and the left side rack surface.

The optical lenses over the LED lamps of the specific orientation luminaire can be arranged wherein at least one farthest located LED lamp with lensed optics above from the vertical central axis of the luminaire (nadir) illuminates a remote surface of a subfield of illumination, while at least one different LED lamp with lensed optics above disposed near the vertical axis of the luminaire (nadir) illuminates a subfield of illumination located closer to the luminaire.

Furthermore, the orientation specific luminaire with the coupled LED lamps and lens optics above located in proximity to a subfield of illumination can be configured to illuminate a larger subfield of illumination area in closer proximity than a same power input LED lamp with a lensed optics above illuminating a remote subfield of illumination, with both having approximately the same light levels within their respective subfields of illumination.

In a different embodiment with LED lamps coupled to an orientation specific square or rectangular formed luminaire, the array of LED lamps in proximity to the longitudinal horizontal central axis of the luminaire can illuminate the bottom tiers of a vertical surface face while the array of the LED lamps located at the outer parameter of the luminaire, parallel to the longitudinal axis of the luminaire, can illuminate the higher tiers of the vertical surface face.

The orientation specific luminaire can be mounted over an elongated space such as a racked aisle. The height of the orientation specific luminaire lensed optics and light source can be configured in relation to the racks' height. The optical lenses disposed, and the LED light source output disposed below the lens/es of the orientation specific luminaire can be configured for different mounting heights of luminaires. For example, the optical lenses can be configured for mounting heights that range between 15-25 ft, 25-35 ft, and 35-45 ft above finished floor. Similarly, and in conjunction with the height, the optical lenses can be configured for three aisle widths, such as 6 ft, 9 ft and 12 ft.

The optical lenses can be removable and interchangeable as in some environments, the width and the height of vertical floor mounted fixtures such as racks occasionally change. In addition, the luminaire's mounting height can also change, necessitating a different lensed optics.

The orientation specific luminaire efficiently and precisely illuminates elongated spaces with aisle widths varying between 6 ft and 12 ft with vertical surfaces extending from 20 ft to as high as 50 ft from finish floor level. The orientation specific luminaire can also efficiently illuminate wide open spaces. Example features of the orientation specific luminaire and its elements include:

1. Regardless of the PCB shape, a PCB can be populated with LED lamps that are arranged orthogonally, concentrically or a combination of both.
2. Orientation specific luminaire lensed optics positioned over at least one PCB coupled to a plurality of lamps allows for illumination at least one vertical surface and a horizontal surface/s below employing a symmetric light emittance pattern, an asymmetric light emittance pattern, or a combination of the two.
3. Orientation specific luminaire lensed optics may be sized to accommodate one or several lamps under a single lens to illuminate at least one remote field of illumination, and at least one a single lamp under a single lens can illuminate at least one near subfield of illumination that is closer to the luminaire than the at least one remote to the luminaire subfield of illumination.
4. Regardless of an elongated aisle width and/or the height of adjacent vertical surface/s, the optics of the orientation specific luminaire mounted above the aisle is configured to deliver maximum average vertical light levels at and/or in proximity to an adult human eye level within the inclusive range.
5. The intensity of the average vertical light levels on a vertical surface below, or below and above an adult human eye level is less than the intensity of the average vertical light level on the same vertical surface within the inclusive range.
6. The vertical average light level on a vertical surface of an elongated space above the inclusive range is no less than 0.3 times the average vertical light level within the inclusive range.
7. The vertical average light level on a vertical surface of an elongated space below the inclusive range is no less than 0.6 times the average vertical light level within the inclusive range.
8. The light rays emitted from an orientation specific luminaire above an elongated space aisle do not exceed 45° above the vertical axis (nadir) of the luminaire.
9. The optics of the orientation specific luminaire lensed exceeding 45° above the vertical axis (nadir) of the luminaire are configured to direct light rays away from an adult human eye toward the elongated space vertical surfaces above the inclusive range.
10. The maximum to minimum illumination uniformity ratio of a vertical surface illuminated by an orientation specific luminaire that is mounted above an aisle is no greater than 3:1.
11. The maximum to minimum horizontal light level ratio at 3'-0" above an elongated space aisle as illuminated by an orientation specific luminaire mounted above is set to be equal to or better than 1.25:1.0.
12. The orientation specific luminaire vertical light level average measured within the inclusive range in proximity at an average eye level height of an adult human is no less than 50% of the average horizontal light level measured 3'-0" above an aisle floor adjacent to the vertical surface.
13. A lighting system may include an orientation specific luminaire with orientation specific light source lensed optics coupled to a mechanical orientation device by at least one pair of suspended cables and/or chains wherein the mechanical orientation device is configured to rotate the luminaire with its coupled optics to a specified optical targeting position.
14. A lighting system may include an orientation specific luminaire with orientation specific light source lensed optics coupled to a mechanical orientation device by at least one pair of suspended cables and/or chains wherein, the orientation specific luminaire optics' orientation is secured by at least one bolt that is coupled to the mechanical orientation device.
15. A lighting system may include an orientation specific luminaire with orientation specific light source lensed optics coupled to a mechanical orientation device by at least one pair of suspended cables and/or chains, and the luminaire suspended by at least two support members is coupled to the support structure above by a single point of connectivity.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION WITH REFERENCE TO DRAWINGS

Figure 2:
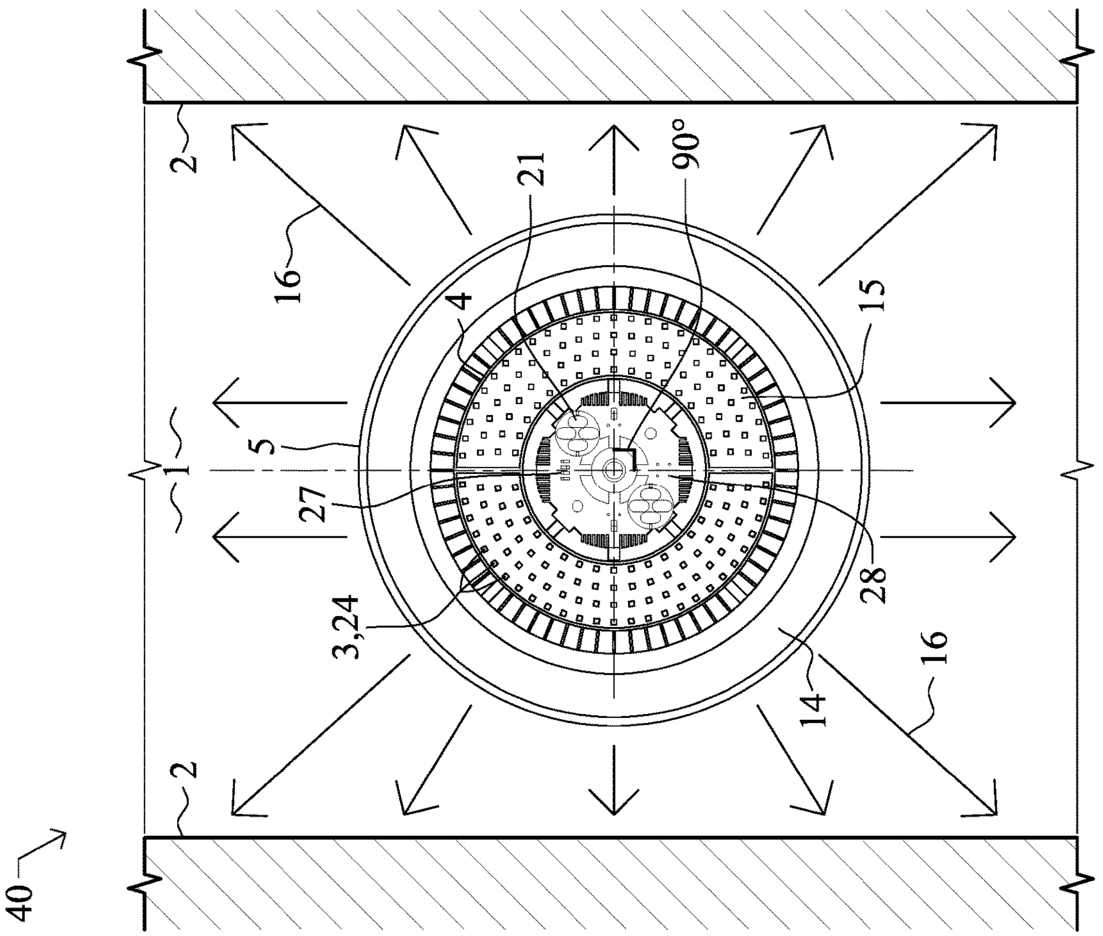
FIG. 2 shows a round luminaire with two coupled crescent shaped PCBs retaining a plurality of LED lamps disposed over an elongated space.

FIG. 2 shows a round orientation specific luminaire 5 with two coupled crescent formed PCB's retaining a plurality of LED lamps mounted above an elongated space aisle 40. The elongated space 40 includes at least a horizontal surface/floor 1 (sometimes referred to as an aisle horizontal surface), and vertical surfaces 2 (sometimes referred to as a face or a rack). FIG. 2 is shown from the perspective of a ceiling above the luminaire 5 and to which the luminaire 5 is supported directly, or indirectly. The elongated space 40 is typically defined by an aisle floor 1 with vertical surfaces 2 adjacent to the long side of the aisle's floor surface 1. The orientation specific luminaire 5 is configured to be mounted above an aisle 1 of an elongated space 40 with specific orientation lensed optics 24. The specific orientation lensed optics is disposed over a plurality of LED lamps 3 coupled to at least one PCB 15. The at least one PCB 15 is coupled to a retaining heat sink 4 that in FIG. 2 is shown coupled to the luminaire's electronic device housing 22 (see FIG. 3). In this embodiment two crescent shaped PCBs 15 are included, along with a central hub that includes egress light sources 21, switch 27, and indicator lights 28.

Figure 3:
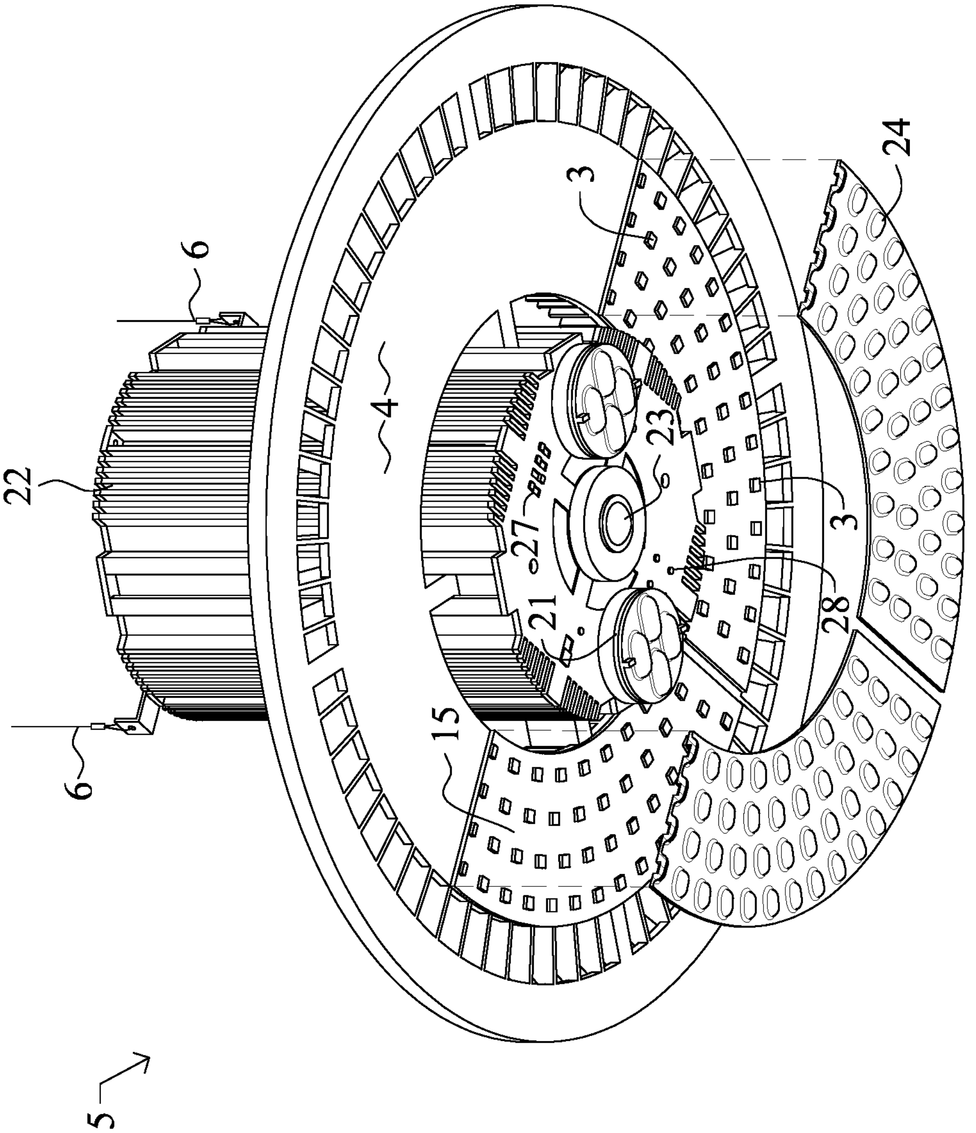
FIG. 3 is a bottom view perspective of the orientation specific luminaire with a crescent shaped optical lens detached from the PCB with coupled LED lamps.
Figure 5:
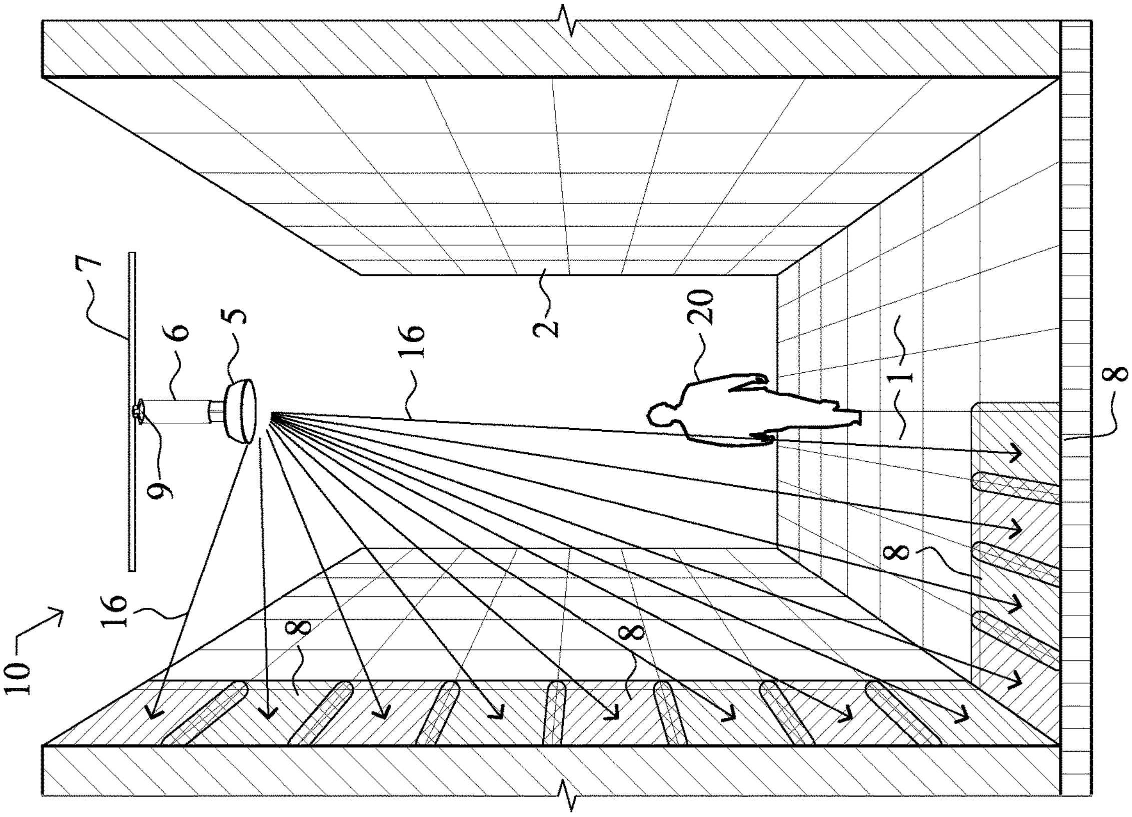
FIG. 5 is an end view of aisleway with zonal sub regions of a light dispersion arrangement across a vertical wall/rack and a horizontal floor surface of an elongated space.

In FIG. 2 the orientation specific luminaire 5 is shown mounted above a racked aisle 10 (as shown in FIG. 5), and in FIG. 3 a perspective view of the luminaire 5 is shown. At the bottom face of the luminaire's electronic device housing 22 (FIG. 3) several power consuming devices are shown coupled. The devices shown include an emergency egress light source 21 (which itself includes multiple LED lamps as shown), a camera/occupancy sensor 23, and a transceiver 26. The transceiver may be wired or wireless, and provides signals to/from a controller that is also housed in the luminaire's electronic device housing 22. A plurality of electronic devices with different functionality are optionally coupled to the electronic device housing 22. These devices can couple to the electronic device housing by a plurality "plug n' play" universal low voltage receptacles. The receptacles can be configured to convey only power, or power and data.

Briefly touching on the emergency egress light source 21, FIGS. 2 and 3 show two such emergency egress light sources 21 coupled to the electronic device housing 22. Each of these devices has a directional light beam, the orientation of which is set by rotation to align over a path of egress. The two devices are arranged back to back to illuminate a linear path of egress on the aisle surface 1.

Briefly touching on the occupancy sensor/camera with transceiver 23, in at least one embodiment the occupancy sensor/camera with transceiver 23 include one or more processors that provide image detection, and can identify a forklift stopped in its vicinity and cause the light to dim under condition the forklift it detected. Dimming the light reduces the eye strain of the forklift operator and can help avoid injury and/or damage. Similarly, a communication device coupled to the forklift automatically or an operator of the forklift manually can direct a luminaire in the immediate vicinity to dim its output light intensity.

Other electronic features that can be integrated with the electronic device housing 22 include at least one of, an indicator light 28 and a switch 27. In at least one embodiment the switch 27 can control at least one of, a lighting circuit, light output, power input to a light source, color temperature of a light source, and/or associated other device/s with the light source/s such as an up-light lighting component.

The orientation specific luminaire 5 shown in FIG. 2 includes a reflector/refractor 14 extending downwardly from a perimeter of the luminaire. While the optics of the orientation specific luminaire directs the output light from the LED lamps to meet all illumination requirements within an elongated space, architecturally in specifically retail spaces, a reflector, or a refractor appearance and/or added performance is often desired as a compliment. Thus, the present embodiments include the reflector or refractor and an optional accessory.

Arrows in FIG. 2 represent light rays emanating from the specific orientation luminaire 5. The arrows represent a controlled approach to casting the luminaire's light within the elongated space 40. A portion of the light emitted is configured to illuminate the face of the racks of the vertical surface 2 and the remainder of the light emitted illuminate the floor surface 1 below. In at least one different embodiment (not shown), the orientation specific luminaire 5 can have an additional light source illuminating at least one surface above the luminaire 5.

The illumination solution of the present embodiment employs a substantially horizontally disposed planar light emitting surface to illuminate both horizontal and vertical surfaces. Furthermore, the light delivered over the horizontal and vertical surfaces is precisely configured to fall where needed at the specified light level intensity. To achieve this fit, dedicated lensed optics are positioned above at least one LED lamp to direct light from the individual LEDs toward particular locations on the vertical surface. Overlap of separate light combine to provide a total luminance in respective subregions across the vertical surface.

FIG. 2 shows two crescent formed PCBs 15 coupled to the orientation specific luminaire 5 heat sink 4. The PCBs 15 show a plurality of LED lamps 3 coupled with the lensed optics 24 (also see FIG. 3) disposed over the LED lamps 3. Each one of the PCBs 15 is configured to illuminate at least one vertical and horizontal surface 1, 2 (FIG. 5) from the orientation specific luminaire 5. In a different embodiment, one PCB or several PCBs with coupled LED lamps and lensed optics can equally illuminate these surfaces; however, for clarity the present figure shows the two crescent formed PCB's arranged about the longitudinal axis of the aisle surface 1 below.

The distribution pattern of LED lamps around the PCB 15 are typically printed in concentric arcs (portions of a ring) about the vertical central axis of the PCB. Another approach that can be useful in designing and forming the lensed optics placed above the LED lamps 3 is orthogonal printing. For illustration purposes, the LED lamps 3 shown on the left side PCB 15 are printed concentrically, while the LED lamps 3 shown on the right side PCB 15 are printed orthogonally (e.g., in a grid array).

The PCB/s with the coupled LED lamps and lensed optics above can be scaled up/down. The assembly can be detached from the luminaire wherein the luminaire can be fitted with a different PCB lamp/optics arrangement. Such an arrangement can configure different luminaire mounting heights and/or aisle widths. The arrangement of LED lamps with their respective lensed optics can zone the lamps differently, employ different lamp size, color temperature, lamp chromaticity and input power.

Further, each PCB can have at least one power circuit and where more than one circuit is used, each circuit can be controlled differently or in unison. For example, referring to dimming a portion of the luminaire 5 light during stocking, when a sensing device such as an occupancy sensor and/or the camera with transceiver 23 sends a signal to the luminaire, only the circuit illuminating the horizontal aisle surface 1 is dimmed or turned off while the racked vertical surface 2 is fully or partially illuminated. The transceiver can also be separate from the camera.

FIG. 3 shows a bottom perspective view of the orientation specific luminaire with a crescent form optical lens detached from the PCB with coupled LED lamps. FIG. 3 shows a partial view of a crescent shaped luminaire heat sink 4. The heat sink 4 is exposed and sized to receive a PCB 15 with a plurality of LED light source/s 3 and optics 24 over the PCB 15.

On a bottom side of the exposed heat sink 4, there are two partial PCB 15 sections with coupled light sources 3 that are shown to be coupled to the luminaire's heat sink 4. Two partial lensed optics 24 shown below the PCB's 15 are configured to be positioned below and in proximity to corresponding light sources 3. The lensed optics 24 is key for delivering the specified light levels onto designated surfaces.

For this reason, both the orientation specific and the non-orientation specific lensed optics is/are designed by computer modeling, with design variables including at least one of, luminaire mounting height, luminaire spacing, the horizontal distance from the luminaire's nadir to a vertical illuminated surface, luminaire distance from targeted horizontal and/or vertical light levels, the light emitted uniformity ratio on the horizontal and/or vertical surfaces, directivity of respective lens, and output levels from each LED. Composite light levels (overlapping light from different LEDs and corresponding lenses) set the illumination level experienced at particular subregions on the vertical surface and horizontal surface of the aisleway.

FIG. 3 also shows a dedicated lensed optics 24 for each light source 3. In another embodiment a lensed optics 24 can be placed over a plurality of light sources 3 (not shown). Further, a plurality of light sources 3 can couple the PCB 15 of at least one of different, size, watt input, color rendition, and chromaticity (not shown).

The light sources 3 coupled to the PCB 15 can be energized by at least one circuit (not shown). The plurality of circuits can control the light emitted by an individual PCB 15 or individual lights on the PCB 15. For example, during off hours, LEDs that emit UV light can decontaminate a space. The PCB 15 with its coupled light sources 3 and lensed optics can be detachable and replaceable by different lensed optics 24 as needed.

FIG. 3 also shows the luminaire 5 with an electronic device housing 22, a cable/chain 6, an emergency egress light source 21, switches 27, an indicator light 28, and an IOT device (with a processor and memory, and optional a transceiver) as an occupancy sensor/camera 23.

Figure 4C:
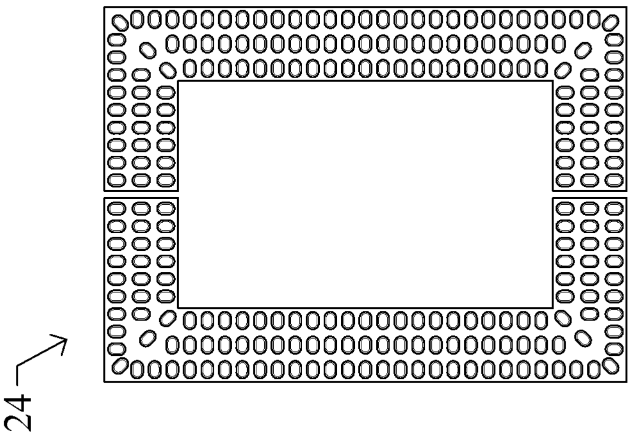
FIG. 4*a*, FIG. 4*b* and FIG. 4*c* show three forms of optical lenses that are detachably attachable to an orientation-specific and/or an orientation non-specific luminaire, each of which has one or more PCBs that have a shape that corresponds with the lens(es) that fits over the one or more PCBs.
Figure 4B:
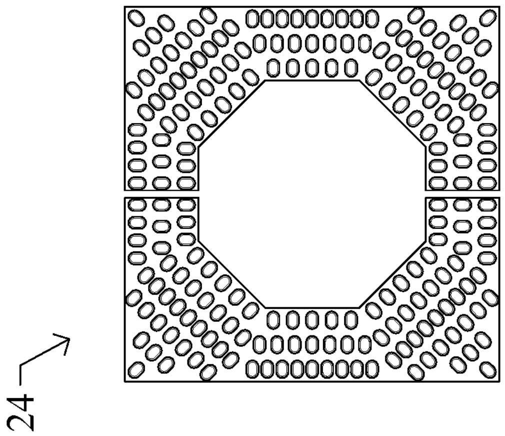
Figure 4A:
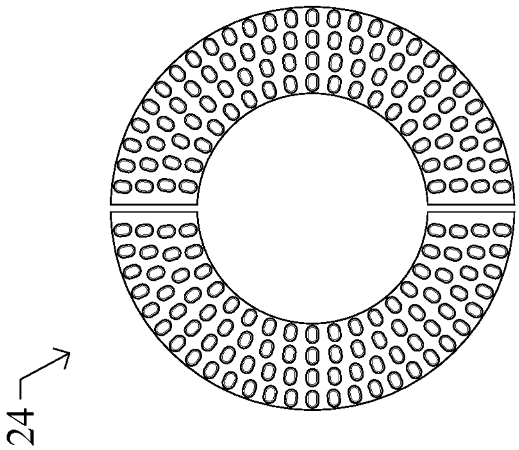

FIGS. 4*a*, 4*b* and 4*c* show by example three forms of optical lenses that can couple to an orientation specific and/or an orientation non-specific luminaire.

The lensed optics 24 of the orientation specific and/or the non-orientation specific luminaire 5 can take any form. This also marks an optical design departure from art that provides generic light optical distribution by form of narrow, medium, and wide light pattern distribution. The lenses used with the luminaire 5 may be customized for an application while capable of illuminating at least one vertical and horizontal surface/s meeting light levels targeted.

FIG. 4*a* shows two optical lenses 24 arranged about a central axis of a round opening. The lenses 24 in FIG. 4*a* can couple to two crescent shaped PCBs 15 with LED lamps arranged in correspondence to the coupled optical lens 24. At least one first optical lens 24 is configured to direct light toward a surface near by the luminaire and at least one second lens is configured to direct light to a remote surface wherein the optical arrangement of the at least one first optical lens 24 differs from the optical design of the at least one second optical lens 24.

Figure 1B:
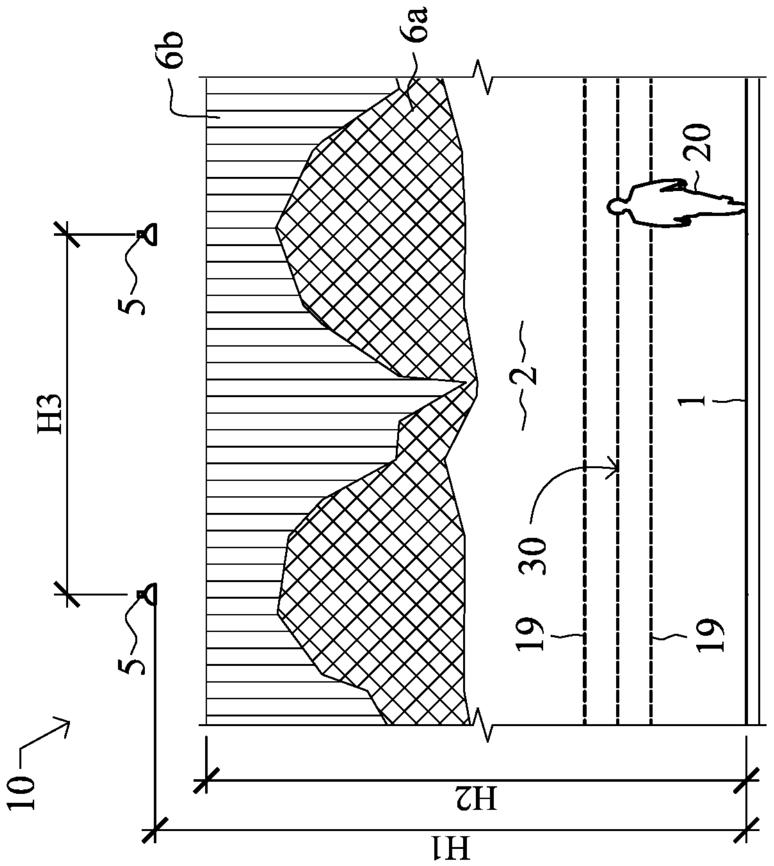
FIGS. 1*a* and 1*b* illustrate illumination vertical illumination inefficiencies of two conventional main brand highbay luminaires and their respective light emittance over vertical racked surfaces.
Figure 1A:
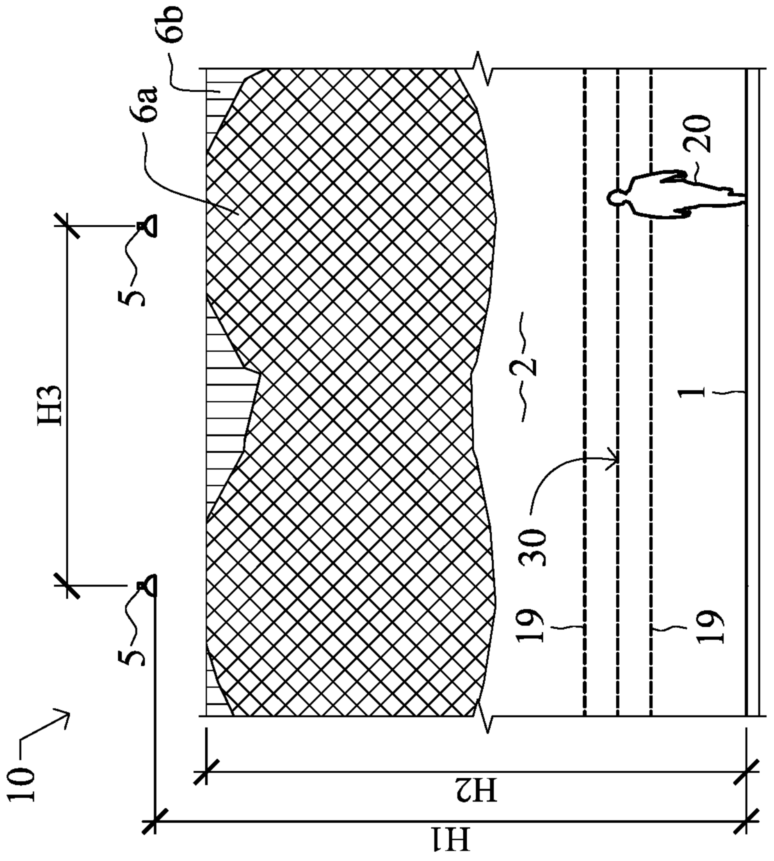

FIG. 4*b* shows a single square formed optical lens 24 that fits over a PCB with a polygonal-shape (e.g., square, rectangular, polygonal, etc.). Similarly to the crescent shaped lensed optics of FIG. 1*a*, the lens shown can be comprised of a plurality of lenses configured to direct the LED light emitted through the lens toward a pre-configured field of illumination below and/or at the side of the luminaire.

FIG. 4*c* shows a rectangular lensed optics comprising two "U" shaped lenses abutting one another at their short legs. The U-shaped lenses fit over a U-shaped PCB that hosts the LEDs. Unlike the round and the square formed optical lenses that are symmetrical about their vertical central axis, the present rectangular lensed embodiment is asymmetrical. Further, the present example shows different sized lensed optics wherein the short leg of each section shows larger sized lenses.

The exemplary lens configurations show that the light delivery form of a luminaire is not contingent on the luminaire form but rather what the light level intensity is expected at the face of a horizontal and/or a vertical subfield of illumination.

FIG. 5 shows a conceptual zonal diagram for a light dispersion arrangement illuminating vertical wall/rack and horizontal floor surfaces of an elongated space. The orientation specific luminaire 5 is shown suspended by two cables/chains 6 over a racked aisle 10. The cable/chain 6 suspension elements are coupled to a mechanical orientation device 9 that is secured to a support structure 7 above. It is noted that the present arrangement converts a two-point mounting to a single point mounting. The luminaire's two-point mounting enables plumbing and orienting the luminaire regardless of the luminaire form. It also assures restoring the luminaire to its original orientation following colliding with a moving object.

The single point mount can eliminate the need for a secondary support structure (not shown), saving material costs and installation production time. The present embodiment includes an orientation specific luminaire 5 with orientation specific optics and a mechanical orientation device that enables orienting the luminaire 5 in relation to at least one of, the longitudinal axis of the racked aisle 10 and a vertical surface of a rack face 2.

FIG. 5 shows an adult human 20 traversing the racked aisle 10. Light rays emanating from the orientation specific luminaire 5 are shown directed toward subfields of illumination 8. The subfields of illumination 8 are quilted across the horizontal floor surface 1 and the vertical rack faces 2. The subfields of illumination 8 extend the full length of the racked aisle 10 wherein in a long aisle a plurality of orientation specific luminaires 5 are spaced apart at increments that enable adequate illumination coverage across the horizontal surface 1 and the vertical racked surfaces 2. In this example, the subfields are 2.5' high by 4' wide, although subfields of different dimensions may be used as well (e.g., heights varying between 6" to 6', and widths from 6" to 10').

For graphic clarity the present figure shows the light rays 16 extending away from the orientation specific luminaire across only one half of the racked aisle 40. The light rays 16 also show only one vertical slice of light rays 16 extending from the aisle floor 1 to the top tier of the racked surface 2. The light rays illuminating the targeted subfield of illumination can overlap their illumination coverage onto at least one adjacent subfield of illumination 8. It is noted that precisely overlapping the illumination coverage over the subfields of illumination 8 can improve the illumination uniformity of the entire field of illumination.

Figure 6:
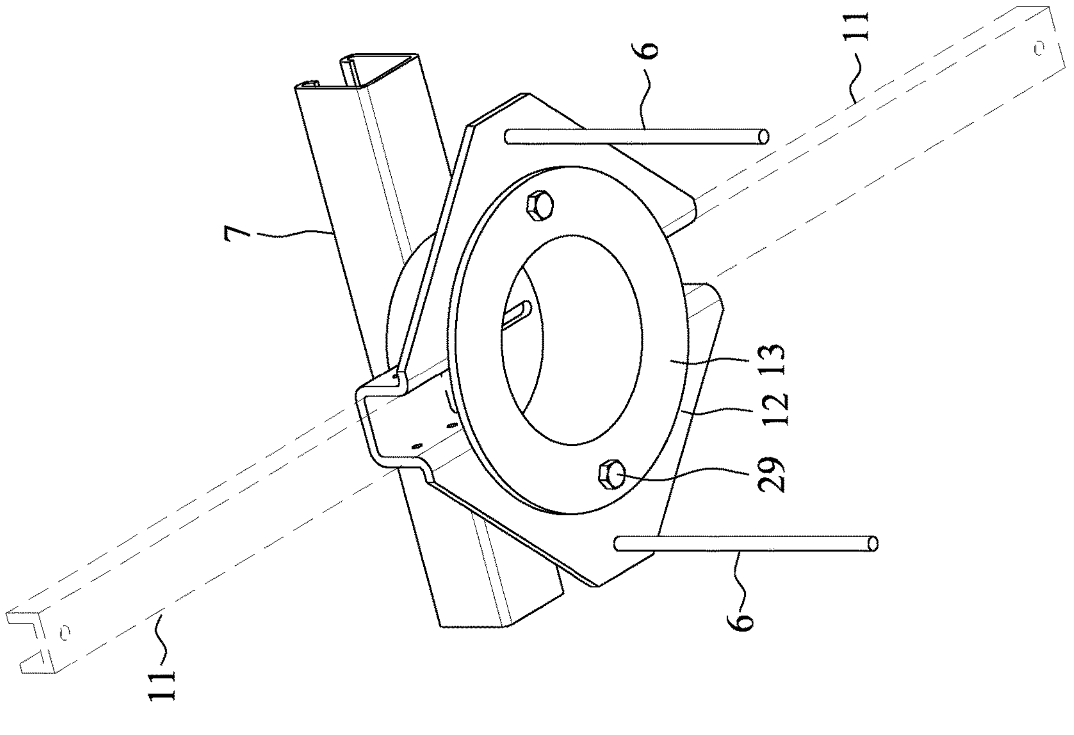
FIG. 6 is a diagram of a single point mechanical orientation mounting device for a luminaire with horizontal rotational capability.

FIG. 6 shows a single point mechanical orientation mounting device for a luminaire with horizontal rotational capability. Moreover, this mechanical orientation mounting device may be used in conjunction with the orientation specific luminaire 5. A more detailed description of the mechanical orientation mounting device is provided in U.S. patent application Ser. No. 18/381,231, the entire contents of which is incorporated herein by reference. The present disclosure elaborates more fully on a system arrangement having the mechanical orientation mounting device 9, the luminaire 5 coupled below, and the suspension cable and/or chain 6 coupling the two elements.

The mechanical orientation mounting device is configured for use with all luminaire forms requiring alignment, especially with luminaire lighting optical dispersion patterns that require an alignment with at least one of, a horizontal surface 1 and a vertical surface 2. In addition, in at least one embodiment, the mechanical orientation mounting device can include power or power and data conveyance circuit/s to the luminaire 5 and/or beyond (not shown).

The mechanical orientation mounting device 9 can house a “plug n' play” power or power and data distribution device. Modular power or power and data conductors can then couple to the power/data distribution module from the exterior of the mechanical orientation mounting device 9 including a drop cable that can couple to the luminaire 5 (not shown). It is noted that the “all in one system” described above can provide luminaire orientation capability by a mono-point mounting device and power or power and data conveyance.

The mechanical orientation mounting device 9 comprises two key elements—an alignment device flange 13 and a rotational disk 12. The alignment device flange 13 is affixed to the support structure 7 above. The rotational disk 12 is positioned above the alignment device flange 13 and is configured to rotate about the vertical central axis of the mechanical orientation mounting device 9.

The rotational disk 12 at opposing sides of the flange 13 below, has elongated crescent shaped through bores arranged about the vertical central axis of the mechanical orientation mounting device (not shown). These elongated bores are configured to vertically align with through bores in the flange of the alignment device flange 13 (not shown).

At least two suspension cables/chains 6 couple to the rotational disk 12. The suspension cables/chains 6 at their opposite sides couple to a luminaire 5. FIG. 6 shows the cables/chains 6 coupling directly to the rotational disk 12. In a different embodiment where large size luminaires and/or other voluminous objects are mounted to the mechanical orientation mounting device 9, extender arms 11 can be used. FIG. 6 shows the extender arms 11 disposed at 90° to the direct mount arrangement.

FIG. 6 also shows alignment bolts 18 coupled to the bottom side of the alignment device flange 13. These bolts secure the alignment of the luminaire 5 in place. The bolts fixedly engage the rotational disk 12 to the alignment device flange 13 through their reciprocating bores. An installer installing a luminaire that requires a specific orientation can then either align and secure the rotational disk 12 in place or suspend the luminaire 5 first and then align and secure the rotational disk 12 in place.

Figure 7B:
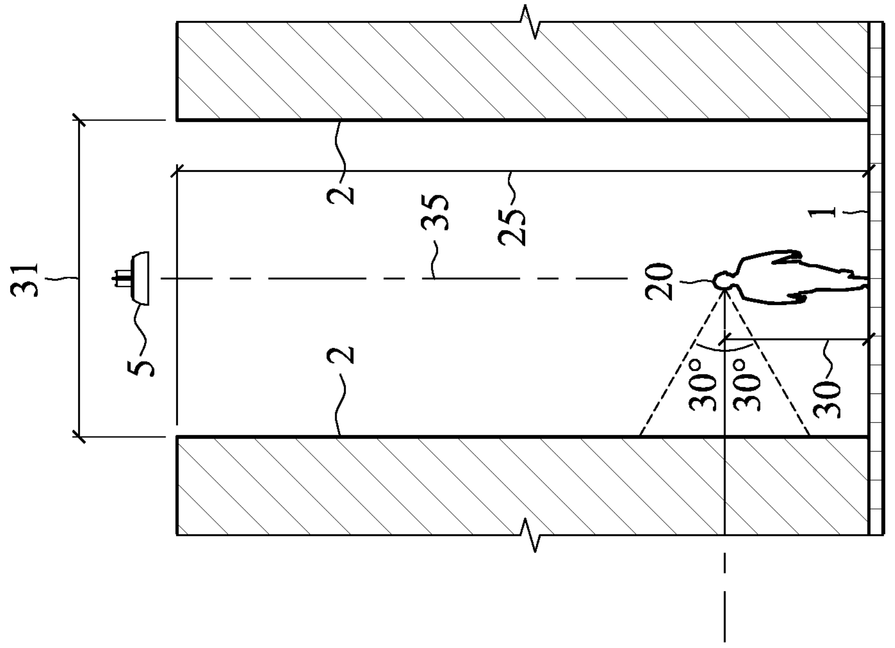
FIG. 7*b* shows a transverse section of a typical racked aisle in relation to the eye level for the typical adult human.
Figure 7A:
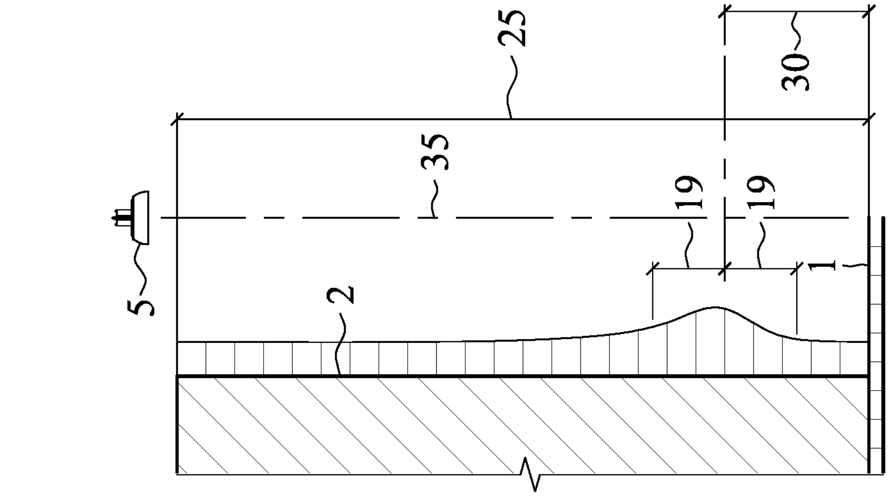
FIG. 7*a* shows a partial transverse section through a vertical surface with an illustration of an overlaid vertical light level distribution over the vertical surface in reference to eye level for a typical adult human.

FIG. 7*a* shows a partial transverse section through a vertical surface showing with a conceptual vertical light level illuminance intensity (region shown with horizontal lines therein) in reference to an average adult human eye level. FIG. 7*b* shows a transverse section of a typical racked aisle in relation to the adult human eye level.

FIG. 7*a* shows the intensity of the vertical illuminance on a vertical surface within an elongated space peaking at an adult human eye level 30, or adjacent to and above and/or below an adult human eye level, where the highest light intensity is needed. This light intensity peak occurs where it is needed in contrast with the intense light levels of present-day art shown in FIGS. 1*a* and 1*b*. The specific lensed optics of the orientation specific luminaire 5 mounted above the horizontal aisle surface 1 is configured to direct light from nadir outwardly in an asymmetrical pattern. In this example, the light intensity distribution has a peak level in a subzone (subfield) that is a height occurring at the height of eye level of an average adult human. The shape around the peak is generally Gaussian in distribution (i.e., bell curve), which is a result of overlapping light patterns directed toward the height of eye level of an average adult human, although having some dispersion about the peak level defined by a standard deviation 19 around the peak level as set by an overlapping of a relatively large number of dispersion patterns from respective LED/lens groups (e.g., pairs). A light level intensity below the inclusive range is no less than 0.6 times the light level intensity within the inclusive range.

The exit angles of the emitted light, the lens light dispersion optical pattern, and the LED lamp intensity are set in relation to the height 25 of the vertical surface 2 that the orientation specific luminaire 5 is tasked to illuminate. FIG. 7*a* shows a ratio that is limited to maximum to minimum ratio of 3:1 between the highest and the lowest vertical illuminance on the vertical surface 2 vertically measuring across the full height 25 of the vertical surface 2 from the floor 1 up. For example, if the specified vertical light level target on a vertical surface of an elongated space is set for 30FC at the height of an adult human eye level within the inclusive range, the lowest vertical light level measured vertically across the same surface from the floor surface 1 up does not fall under 10FC—as shown in FIG. 7*a*.

It is noted that the structure of the present embodiment re-directs light from a light source from a horizontal planar surface of the orientation specific luminaire 5 onto a vertical surface 2 of an elongated space, concentrating the light emitted along a horizontal band 19 at a specific height above a floor 30 while maintaining an excellent maximum to minimum uniformity ratio of 3:1 across the entire surface of the vertical surface 2.

FIG. 7*b* shows a transverse section of a typical racked aisle in relation to the adult human eye level. Visually pairing the side-by-side FIGS. 4*a* and 4*b*, one can see that the adult human eye 30 has a cone of vision of approximately 60° from the horizontal –30° up and 30° down.

Therefore, the eye coverage of an adult human looking straight at a vertical surface 2 of an elongated space illuminated by an orientation specific luminaire 5 falls on a higher vertical illuminance band extending across a portion of the vertical height 25 of the vertical surface 2. The vertical illuminance band width can vary based on the width of the horizontal aisle 1 and/or the placement of the orientation specific luminaire 5 above. However, the illumination ratios pertaining to the vertical illuminance on the vertical surface 2 of the elongated space can remain unchanged.

Figure 8B:
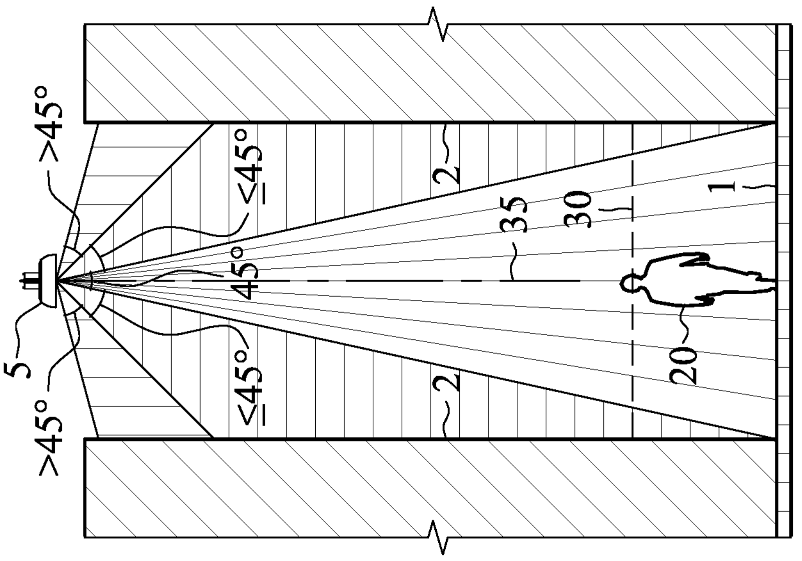
FIG. 8*b* shows the light exit angles of the same luminaire as in FIG. 8*a* although taken transversely across the elongated space.
Figure 8A:
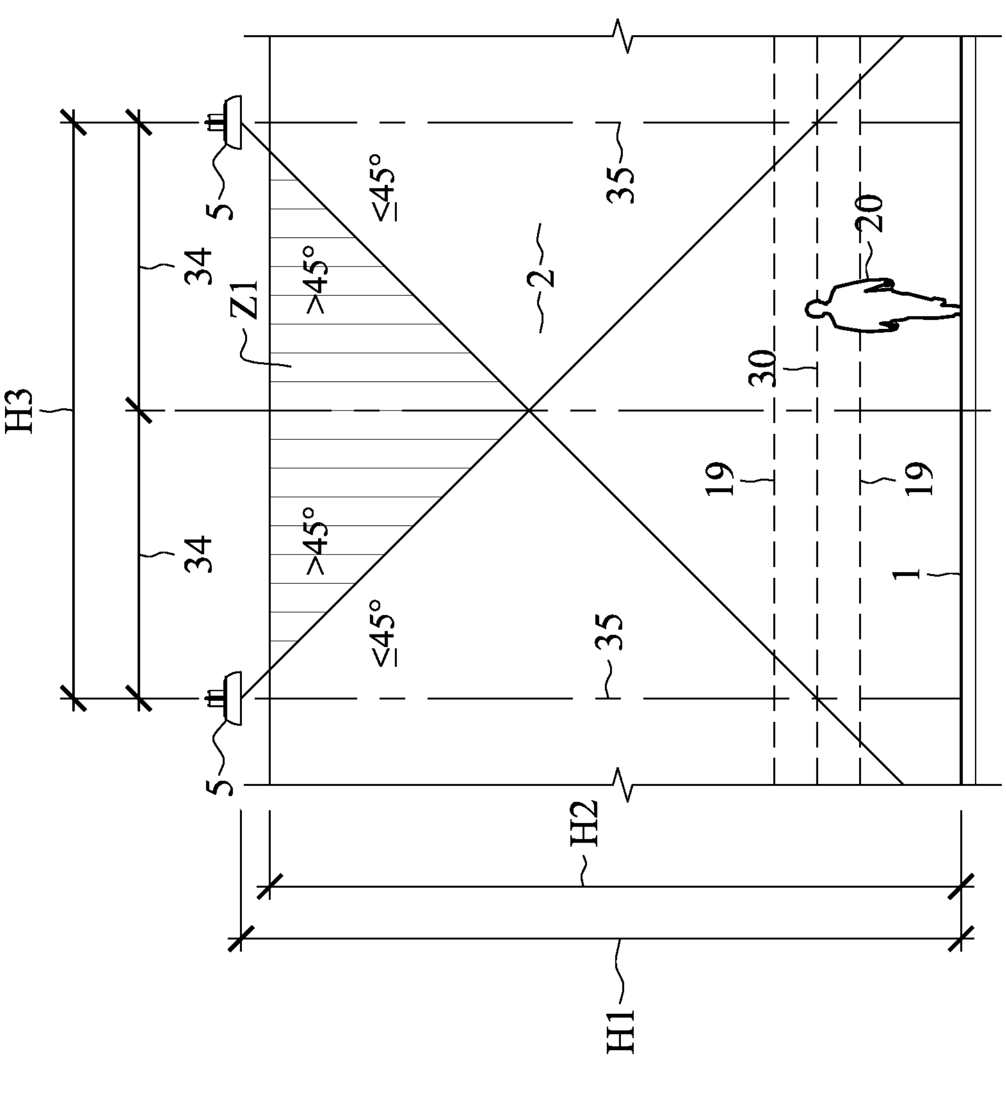
FIG. 8*a* shows light exit angles above a luminaire nadir of a luminaire suspended above a surface of an elongated space.

FIG. 8*a* shows light exit angles above a luminaire nadir of a luminaire suspended above a surface of an elongated space. FIG. 8*b* shows the light exit angles of the same luminaire taken transversely across elongated vertical space.

FIG. 8*a* shows two orientation specific luminaires 5 mounted above a horizontal aisle surface 1 illuminating a vertical surface 2. The luminaires' spacing H3 and mounting height H1 shown corresponds to the luminaires' light source output and the lensed optics arrangement. The present figure shows 45° to nadir 35 as the highest light exit angle from the luminaire 5. Light emitted by the luminaire 5 and directed toward the horizontal aisle surface 1 is configured to be glare free (<46° exit angle) and to uniformly illuminate the aisle surface 1.

A scaled adult human traversing the horizontal surface of the elongated space aisle 1 is shown juxtaposed next to a high vertical surface 25. The vertical surface 2 represents a racked surface. The adult human eyes level 30 above the horizontal aisle surface is approximately 5'-0" as shown in dashed line.

The adult human cone of vision is approximately 60°. The eyes of an adult human looking straight at the rack 2 face perceive a vertical area centered at approximately the human eye level 30. The intense illuminance band extending the length of the vertical surface 2 face is formed by the adjacent surfaces above/below (dashed lines 19) the human eye level 30. The portion of the surface within the upper and lower dashed lines of horizontal band 19 is an illustration of the inclusive range.

FIG. 8*a* illustrates that by dividing the light emitted through each luminaire 5 lensed optics into a horizontal surface and a vertical surface, the overall luminaire efficiency is increased. Limiting the horizontal surface 1 optical light exit angle of the luminaire 5 to a maximum of 45° reduces luminaire's optical losses and eliminates veiling glare, wherein the balance of the downwardly directed light of the luminaire 5, that includes high exit angle light rays, can then be directed away from the eyes of an adult human traversing the horizontal surface of the aisle 1 toward the vertical racked surface 2.

FIG. 8*b* shows the light exit angles of the same luminaire as shown in FIG. 5*a* taken transversely across elongated vertical space. FIG. 8*b* shows the luminaire 5 mounted over an elongated space of a racked aisle 1. The luminaire 5 shown is positioned at approximately a mid-point of the aisles' width having the same illumination requirement on the faces of the racks 2, as the racks are equal in height. In a different embodiment (not shown), the light pattern emitted from one side of an orientation specific luminaire 5 can be different from the light emitted by the opposite side of the luminaire.

FIG. 8*b* shows a symmetrical distribution of two luminaires' light emittance angles in reference to their respective nadirs 35. The luminaires are arranged in relation to at least one of, the vertical surfaces of the racks' face 2 and the central longitudinal axis of the elongated space racked aisle 1. The luminaire's lensed optics is shown to divide the emitted light into a component tasked with illuminating the horizontal surface 1 and a component tasked with illuminating the vertical surface 2 of the elongated space.

The component tasked with illuminating the vertical surface 2 is further divided into two horizontal bands, one that illuminates vertical surfaces equal to or less than a 45° exit angle in relation to nadir, referred to herein as the low angle band, and the other band where the light exit angles in relation to nadir exceed 45° referred to herein as the high angle band. It is noted that the high angle band is higher than the eye level of an adult human 30.

Further, a review of FIGS. 5*a* and 5*b* shows that the distance to the mid-point of a pair of luminaires 5 spaced apart H3 is relatively short in relation to nadir. That said, the proximity from the luminaire's nadir to the high band mid-point 34 vertical surface 2 is relatively short (see FIG. 5*a* crosshatched triangle). While high angle optics emitted through a horizontal planar surface facing downwardly can incur greater losses, the small area and the proximity to the luminaire 5 nadir 35 can offset these losses. In at least one different embodiment (not shown) at least one secondary non-horizontal planar surface with at least one light source coupled with a lensed optics can illuminate a vertical surface 2 more efficiently having a lesser light exit angle.

ELEMENT LIST

1. Horizontal Aisle Surface/Floor
2. Vertical Surface/Rack Face
3. Light Source
4. Heat Sink
5. Orientation Specific Luminaire
6. Cable/Chain
7. Support Structure
8. Array Target/Subfield of Illumination
9. Mechanical Orientation Mounting Device
10. Racked Aisle
11. Extender Arm
12. Rotational Disk
13. Alignment Mechanical Device Flange
14. Reflector/Refractor
15. PCB
16. Light Ray
17. Power and/or Data Conductor
18. Alignment Bolt
19. Boundaries of inclusive range
20. Adult Human
21. Emergency Egress Light Source
22. Electronic Device Housing
23. Occupancy Sensor/Camera, with transceiver
24. Lensed Optics
25. Vertical Surface Height
27. Switch
28. Indicator Light
30. Adult Human Eye Level
31. Aisle Width
32. Luminaire Spacing
33. Luminaire Spacing Mid-point
35. Nadir
36. Luminaire Mounting Height
40. Elongated Space Obviously, numerous modifications and variations of the present disclosure are possible in light of the above teachings. It is therefore to be understood that within the scope of the appended claims, the disclosure may be practiced otherwise than as specifically described herein.

The invention claimed is:

1. An orientation specific luminaire for illuminating a space from above an aisle, the orientation specific luminaire comprising:

a housing that supports a lamp, the housing including a downward facing side that faces a floor of the aisle, and has a predetermined orientation set in relation to at least one of a longitudinal axis of the aisle and a first vertical surface that defines a first side of the aisle;

the lamp, the lamp being supported by the downward facing side of the housing, the lamp including a plurality of light sources distributed across a planar structure, and a lens including a plurality of lens elements, the lens disposed over the plurality of light sources and directs light emitted from the plurality of light sources to provide directional light that illuminates a plurality of vertical illuminated subfields distributed along the first vertical surface and across a plurality of horizontal illuminated subfields distributed along the floor of the aisle, wherein wherein the directional light includes a first component of directional light that is directed toward and illuminates a horizontal illuminated subfield of the plurality of horizontal illuminated subfields, a second component of directional light that is directed toward and illuminates a first vertical illuminated subfield of the plurality of vertical illuminated subfields distributed along the first vertical surface, and the directional light having an illumination distribution over the plurality of vertical illuminated subfields with a peak illumination level occurring within the first vertical illuminated subfield at a height in an inclusive range, the inclusive range being 3 feet through 7 feet above the floor so as to correspond with an average eye level of an adult human.

2. An orientation specific luminaire of claim 1, wherein the lamp further comprising:

a second plurality of light sources that illuminate a second plurality of horizontal illuminated subfields distributed along a portion of the floor.

3. An orientation specific luminaire of claim 2, further comprising:

a second lens including a plurality of second lens elements disposed on a second planar structure, the second lens disposed over the second plurality of light sources and directs light emitted from the second plurality of light sources to provide second directional light that illuminates a second plurality of vertical illuminated subfields distributed along a second vertical surface that defines a second side of the aisle.

4. An orientation specific luminaire of claim 3, wherein the second directional light includes a component of the second directional light that is directed toward and illuminates a first vertical illuminated subfield of the second plurality of vertical illuminated subfields distributed along the second vertical surface, the second directional light having another illumination distribution over the second plurality of vertical illuminated subfields with another peak illumination level occurring within the first vertical illuminated subfield of the second plurality of vertical illuminated subfields at a height in the inclusive range of 3 feet through 7 feet above the floor.

5. The orientation specific luminaire of claim 1, wherein the plurality of light sources are arranged in a predetermined pattern on the planar structure.

6. The orientation specific luminaire of claim 5, wherein the planar structure being a printed circuit board having a surface that is at least one of crescent-shaped, polygonal-shaped, and U-shaped printed circuit board.

7. The orientation specific luminaire of claim 1, wherein the peak illumination level is no less than twice a lowest illumination level on the first vertical surface measured anywhere above or below where the peak illumination level is measured on the first vertical surface.

8. The orientation specific luminaire of claim 1, wherein the first component of directional light exits the luminaire at not more than 45° relative to a nadir of the luminaire.

9. The orientation specific luminaire of claim 1, wherein the second component of directional light includes light rays exceeding 45° from a nadir of the luminaire nadir height above the inclusive range.

10. The orientation specific luminaire of claim 1, wherein at least one light source of the plurality of light sources is positioned to illuminate a surface above the luminaire.

11. The orientation specific luminaire of claim 1, further comprising at least one of a reflector and a refractor coupled to the luminaire.

12. An orientation specific luminaire for illuminating a space from above an aisle, the orientation specific luminaire comprising:

a housing that supports a lamp, the housing including a downward facing side that faces a floor of the aisle, and has an orientation that is set in relation to at least one of a longitudinal axis of the aisle and a first vertical surface that defines a first side of the aisle;

a lamp that is supported by the downward facing side of the housing, the lamp including a plurality of light sources distributed across a planar structure, and a lens including a plurality of lens elements, the lens disposed over the plurality of light sources and directs light emitted from the plurality of light sources to provide directional light that illuminates a plurality of vertical illuminated subfields distributed along the first vertical surface and a plurality of horizontal illuminated subfields distributed along the floor of the aisle, wherein wherein the directional light includes a first component of directional light that is directed toward and illuminates a horizontal illuminated subfield of the plurality of horizontal illuminated subfields, a second component of directional light that is directed toward and illuminates a first vertical illuminated subfield of the plurality of vertical illuminated subfields distributed along the first vertical surface, and the housing is supported from an overhead structure by a single mechanical mounting device that is rotationally-adjustable to align the luminaire with at least one of the plurality of vertical illuminated subfields, the plurality of horizontal illuminated subfields, or an orientation of another luminaire disposed over the aisle.

13. The orientation specific luminaire of claim 12, wherein the luminaire is coupled to the single mechanical orientation mounting device by a pair of at least one cable and/or a chain.

14. The orientation specific luminaire of claim 12, further comprising at least one of two chains or two cables that couple the luminaire to the single mechanical orientation mounting device.

15. The orientation specific luminaire of claim 12, wherein a uniformity ratio between a highest illuminance and a lowest illuminance on the first vertical surface at a same location along the aisle and measured across a full height of the first vertical surface from the floor is not greater than 3:1.

16. The orientation specific luminaire of claim 12, wherein a light level intensity measured on the first vertical surface below 3 feet from the floor is no less than 0.6 of the light level intensity at 3 feet from the floor.

17. The orientation specific luminaire of claim 12, wherein an exit angle of a portion of the directional light that illuminates the floor is no greater than 45° with respect to nadir.

18. The orientation specific luminaire of claim 12, wherein exit angles of light that illuminates the first vertical surface below 7 feet from the floor do not exceed 45° with respect to nadir.

19. An orientation specific luminaire for illuminating a space from above an elongated space, the orientation specific luminaire comprising:

a light source having at least two lamps that emit light downwardly, the lamps are coupled to at least one horizontal or substantially horizontal light source retaining surface, at least two optical lenses are disposed over the at least two lamps, light emitted by the at least two lamps is directed through the at least two optical lenses toward at least two different subfields of illumination located on a face of a single vertical surface within the elongated space, wherein a first optical lens of the at least two optical lenses directs at least a first portion of light toward a first subfield of illumination, the first subfield of illumination is located on a face of a vertical surface of the elongated space at a height in an inclusive range of 3 feet through 7 feet above the floor so as to correspond with an average eye level of an adult human, a second optical lens of the at least two optical lenses directs at least a second portion of light toward a second subfield of illumination located on the face of the vertical surface of the elongated space above and/or below the first target subfield of illumination wherein, an average light level intensity of the second subfield of illumination measured vertically at the face of the vertical surface is lower than an average light level of the first subfield of illumination, and an orientation of the specific orientation luminaire is set to correspond with the at least two optical lenses and to align with at least one of a longitudinal axis of an aisle below and an adjacent vertical surface, and light that exits the light source at an angle of 45° or higher with respect to nadir illuminates a portion of the adjacent vertical surface that exceeds 7 feet above the floor of the aisle.

20. The orientation specific luminaire of claim 19, wherein an average light level of a subfield of illumination in the inclusive range is no less than 50% of an average light level over the aisle adjacent to the face of the vertical surface measured at 3'-0" above finish floor.

21. The orientation specific luminaire of claim 19, wherein an average light level on at least one subfield of illumination on a face of a vertical surface below the inclusive range is no less than 0.6 times an average light level in the inclusive range.

22. The orientation specific luminaire of claim 19, wherein an average light level on at least one subfield of illumination on a face of a vertical surface below the inclusive range is no less than 0.3 times an average light level above the inclusive range.

23. The orientation specific luminaire of claim 19, wherein an exit angle of light that exits the light source that illuminates a floor of the aisle is no greater than 45° from nadir.

24. The orientation specific luminaire of claim 19, further comprising a mechanical orientation device that is configured to set an orientation of the luminaire to one of a plurality of user-settable positions.

25. The orientation specific luminaire of claim 19, wherein the luminaire is suspended so as to return to an original position after being contacted by a moving object.

26. An orientation specific luminaire for illuminating a space from above an elongated space, the orientation specific luminaire comprising:

a light source having a first lighting group having at least two first lamps that emit light downwardly, the at least two first lamps are coupled to at least one horizontal or substantially horizontal light source retaining surface, at least two first optical lenses are disposed over the at least two first lamps, light emitted by the at least two first lamps is directed through the at least two first optical lenses toward at least two different subfields of illumination located on a face of a first vertical surface within the elongated space, and a second lighting group having at least two second lamps that emit light downwardly, the at least two second lamps are coupled to at least one horizontal or substantially horizontal light source retaining surface, at least two second optical lenses disposed over the at least two second lamps, light emitted by the at least two second lamps is directed through the at least two second optical lenses toward at least two different subfields of illumination located on a face of a second vertical surface within the elongated space, the first vertical surface being on one side of a floor of the elongated space and the second vertical surface being on an opposite side of the floor, wherein the orientation specific luminaire is rotatable about a central vertical axis thereof to reorient light emitted by the at least two second lamps toward horizontal subfields of illumination disposed on an aisle floor surface, exit angles of light from the first lighting group that illuminate the first vertical surface in an inclusive range of 3 feet through 7 feet above the floor, as well as below the inclusive range, and exit angles of light from the second lighting group that illuminate the floor are no greater than 45° from nadir, and an average light level on first vertical surface in the inclusive range that is greater than an average light level on the vertical surface above and below the inclusive range.

27. The orientation specific luminaire of claim 26, wherein a first lamp of the at least two first lamps directs light toward a first subfield, and a second lamp of the at least two first lamps directs light toward a second subfield that is adjacent to the first subfield on the first vertical surface.

28. The orientation specific luminaire of claim 26, wherein light emitted over a first horizontal subfield of illumination on the first vertical surface overlaps at least a first vertical subfield of illumination that is disposed adjacent to the first horizontal subfield of illumination.

29. The orientation specific luminaire of claim 26, wherein a first lens of the at least two first lenses emits light that covers a larger subfield of illumination area on the first vertical surface in proximity to the luminaire than another subfield of illumination that is further from the luminaire.

30. The orientation specific luminaire of claim 26, further comprising at least one electronic device that is coupled to the luminaire housing, the at least one electronic device being a different electronic device than a light source, and includes a processing circuitry.

* * * * *